(12) United States Patent
Yang et al.

(10) Patent No.: US 11,837,744 B2
(45) Date of Patent: Dec. 5, 2023

(54) BATTERY PACK AND ELECTRICAL CONSUMER

(71) Applicant: XIAMEN HITHIUM ENERGY STORAGE TECHNOLOGY CO., LTD., Fujian (CN)

(72) Inventors: Qiang Yang, Fujian (CN); Weidong Xu, Fujian (CN); Nan Zhang, Fujian (CN)

(73) Assignee: Xiamen Hithium Energy Storage Technology Co., Ltd., Fujian (CN)

( * ) Notice: Subject to any disclaimer, the term of this patent is extended or adjusted under 35 U.S.C. 154(b) by 8 days.

(21) Appl. No.: 17/898,768

(22) Filed: Aug. 30, 2022

(65) Prior Publication Data

US 2023/0069051 A1 Mar. 2, 2023

(30) Foreign Application Priority Data

Aug. 31, 2021 (CN) .......................... 202111017142.5
Aug. 31, 2021 (CN) .......................... 202122087578.3

(51) Int. Cl.
*H01M 50/256* (2021.01)
*H01M 50/204* (2021.01)

(52) U.S. Cl.
CPC ....... *H01M 50/256* (2021.01); *H01M 50/204* (2021.01)

(58) Field of Classification Search
CPC .... H01M 50/256; H01M 50/204; Y02E 60/10
See application file for complete search history.

(56) References Cited

U.S. PATENT DOCUMENTS 6,022,638 A * 2/2000 Horton ................ H01M 50/256
16/DIG. 15

FOREIGN PATENT DOCUMENTS

JP 2009277504 * 11/2009 .............. H01M 2/10

OTHER PUBLICATIONS

English Translation of JP2009277504.*

* cited by examiner

*Primary Examiner* — Kiran Quraishi Akhtar
(74) *Attorney, Agent, or Firm* — IP Spring (57) ABSTRACT

A battery pack and an electrical consumer are provided. The battery pack includes multiple battery cells, box, and a handle. The box includes a first housing and a second housing. The first housing and the second housing together define a first accommodation cavity and at least one second accommodation cavity, and each of the first housing and the second housing is provided with a first limiting portion at a top of each of the at least one second accommodation cavity. The handle includes a handle body, at least one connecting portion, and second limiting portions. The second limiting portions are connected with the handle body and/or the at least one connecting portion, the at least one connecting portion is disposed in the at least one second accommodation cavity respectively.

20 Claims, 6 Drawing Sheets

BATTERY PACK AND ELECTRICAL CONSUMER

CROSS-REFERENCE TO RELATED APPLICATIONS

This application claims priority under 35 U.S.C. § 119(a) to Chinese Patent Application No. 202111017142.5, filed Aug. 31, 2021, and Chinese Patent Application No. 202122087578.3, filed Aug. 31, 2021, the entire disclosure of which are incorporated herein by reference.

TECHNICAL FIELD

This disclosure relates to the field of household batteries, and in particular to a battery pack and an electrical consumer.

BACKGROUND

Under pressures of energy crisis and environmental pollution, safety, environmental protection, and energy conservation are becoming more and more important in today's social development. Therefore, an energy storage device is more and more widely used due to the energy storage's characteristics of energy-saving, environmental protection, and pollution-free. For example, the energy storage device can be used in an electric vehicle, electronic device, and other application fields.

In the related art, generally, a box used to mount a battery has an up-down combined structure, such that when a user repeatedly lifts the box, a battery is easy to fall off a bottom of the box due to insufficient bearing force at the bottom of the box, thereby affecting normal use of an electrical consumer.

SUMMARY

According to implementations of a first aspect of the present disclosure, a battery pack includes multiple battery cells, a box, and a handle. The box includes a first housing and a second housing. The first housing and the second housing are disposed opposite to each other, the first housing and the second housing together define a first accommodation cavity and at least one second accommodation cavity, the at least one second accommodation cavity is defined at a side of the first accommodation cavity, the multiple battery cells are accommodated in the first accommodation cavity, and each of the first housing and the second housing is provided with a first limiting portion at a top of each of the at least one second accommodation cavity. The handle includes a handle body, at least one connecting portion, and second limiting portions, the at least one connecting portion is connected with the handle body, the second limiting portions are connected with the handle body and/or the at least one connecting portion, the at least one connecting portion is disposed in the at least one second accommodation cavity respectively and is configured to move between the top of the at least one second accommodation cavity and a bottom of the at least one second accommodation cavity, and the second limiting portions are in limiting fitment with first limiting portions of the first housing and the second housing respectively to provide the first housing and the second housing with extrusion pressures towards each other.

According to implementations of a second aspect of the present disclosure, an electrical consumer includes a battery pack. The battery pack includes multiple battery cells, a box, and a handle. The box includes a first housing and a second housing. The first housing and the second housing are disposed opposite to each other, the first housing and the second housing together define a first accommodation cavity and at least one second accommodation cavity, the at least one second accommodation cavity is defined at a side of the first accommodation cavity, the multiple battery cells are accommodated in the first accommodation cavity, and each of the first housing and the second housing is provided with a first limiting portion at a top of each of the at least one second accommodation cavity. The handle includes a handle body, at least one connecting portion, and second limiting portions, the at least one connecting portion is connected with the handle body, the second limiting portions are connected with the handle body and/or the at least one connecting portion, the at least one connecting portion is disposed in the at least one second accommodation cavity respectively and is configured to move between the top of the at least one second accommodation cavity and a bottom of the at least one second accommodation cavity, and the second limiting portions are in limiting fitment with first limiting portions of the first housing and the second housing respectively to provide the first housing and the second housing with extrusion pressures towards each other.

BRIEF DESCRIPTION OF THE DRAWINGS

The above and/or additional aspects and advantages of the present disclosure will become apparent and easy to be understood from descriptions of the implementations with reference to accompanying drawings.

Reference signs:

100, battery pack; 10, battery cell; 20, box; 21, first housing; 22, second housing; 23, first accommodation cavity; 24, second accommodation cavity; 1a, top of second accommodation cavity; 1b, bottom of second accommodation cavity; 25, housing body; 26, protrusion; 2a, top of protrusion; 27, first plate portion; 28, second plate portion; 29, third plate portion; 30, guiding rib; 31, limiting groove; 32, avoiding notch; 40, handle; 41, handle body; 42, connecting portion; 3a, top of connecting portion; 43, guiding groove; 44, stiffener; 45, weight reducing groove; 46, limiting plate; 47, internal surface.

DETAILED DESCRIPTION

Reference can be made to FIG. 1 to FIG. 6, and a battery pack 100 is described below according to implementations of the present disclosure. An electrical consumer with the above battery pack 100 is further proposed in the present disclosure.

As illustrated in figures, according to implementations of a first aspect of the present disclosure, the battery pack 100 includes multiple battery cells 10, a box 20, and a handle 40. The box 20 includes a first housing 21 and a second housing 22. The first housing 21 and the second housing 22 are disposed opposite to each other, the first housing 21 and the second housing 22 together define a first accommodation cavity 23 and at least one second accommodation cavity 24, the at least one second accommodation cavity 24 is defined at a side of the first accommodation cavity 23, the multiple battery cells 10 are accommodated in the first accommodation cavity 23. In other words, the box 20 includes two parts, which are the first housing 21 and the second housing 22, the two parts are disposed opposite to each other to mount, and the first housing 21 and the second housing 22 together define the first accommodation cavity 23 and the at least one second accommodation cavity 24. In this way, the first housing 21 and the second housing 22 which are disposed on the left and the right can make gravity of the multiple battery cells 10 uniformly distributed on the first housing 21 and the second housing 22, and part of the handle 40 can be in fitment with the at least one second accommodation cavity 24, such that the handle 40 can be connected with the box 20.

As illustrated in the figures, the handle 40 includes a handle body 41 and at least one connecting portion 42. The at least one connecting portion 42 is connected with the handle body 41, and the at least one connecting portion 42 is disposed in the at least one second accommodation cavity 24 respectively and is configured to move between a top 1a of the at least one second accommodation cavity 24 and a bottom 1b of the at least one second accommodation cavity 24. In other words, the handle 40 includes two parts, which are the handle body 41 and a connecting portion 42, and the connecting portion 42 is disposed in a second accommodation cavity 24. With this disposing, the handle 40 can be well detached and replaced, such that a strength of the connection between the handle 40 and the box 20 is strengthened, and an overall usability of the battery pack 100 is improved. In addition, the at least one connecting portion 42 can be movably disposed in the at least one second accommodation cavity 24 respectively, which is convenient for a user to lift and carry the battery pack 100.

In addition, each of the first housing 21 and the second housing 22 is provided with a first limiting portion at the top 1a of each of the at least one second accommodation cavity 24, and the handle 40 further includes second limiting portions. The second limiting portions are connected with the handle body 41 and each of the at least one connecting portion 42, and the second limiting portions are in limiting fitment with first limiting portions of the first housing 21 and the second housing 22 respectively to provide the first housing 21 and the second housing 22 with extrusion pressures towards each other. In other words, when each of the at least one connecting portion 42 moves to the top 1a of each of the at least one second accommodation cavity 24, each first limiting portion is in limiting fitment with each second limiting portion. With this disposing, the first housing 21 and the second housing 22 which are disposed on the left and the right can be squeezed towards the middle of the first housing 21 and the second housing 22 to prevent the first housing 21 and the second housing 22 from cracking outwards, such that stability of a connection between the first housing 21 and the second housing 22 can be improved. When the at least one connecting portion 42 moves to the bottom 1b of each of the at least one second accommodation cavity 24, the each first limiting portion is partially connected with the each second limiting portion, or the each first limiting portion is separated from the each second limiting portion.

Therefore, the second limiting portions are disposed at the handle 40 and the first limiting portions are disposed at the box 20, such that when the handle 40 is located at the top 1a of each of the at least one second accommodation cavity 24, the each first limiting portion is in limiting fitment with the each second limiting portion, which can make the first housing 21 and the second housing 22 squeezed towards the middle of the first housing 21 and the second housing 22 to prevent the first housing 21 and the second housing 22 from cracking outwards.

Furthermore, one of the first limiting portion and a second limiting portion may be a limiting groove 31, another may be a limiting plate 46, and the limiting plate 46 is in fitment with the limiting groove 31. In other words, the first limiting portion may be one of the limiting groove 31 and the limiting plate 46, the second limiting portion may be another of the limiting groove 31 and the limiting plate 46, and the limiting groove 31 is in limiting fitment with the limiting plate 46. With this disposing, after the handle 40 is connected with the first housing 21 and the second housing 22, mutual fitting between the limiting groove 31 and the limiting plate 46 can pull the first housing 21 and the second housing 22 together, such that the stability of the connection between the first housing 21 and the second housing 22 can be improved, and stability of the connection between the handle 40 and the box 20 can also be improved. In addition, when the handle 40 is located in an accommodation position, the handle 40 moves towards the box 20, such that the limiting groove 31 is partially separated from the limiting plate 46. The limiting plate 46 can also play a role in guiding, such that when the handle 40 moves up and down relative to the box 20, the limiting plate 46 can be in fitment with the limiting groove 31 conveniently.

Figure 3:
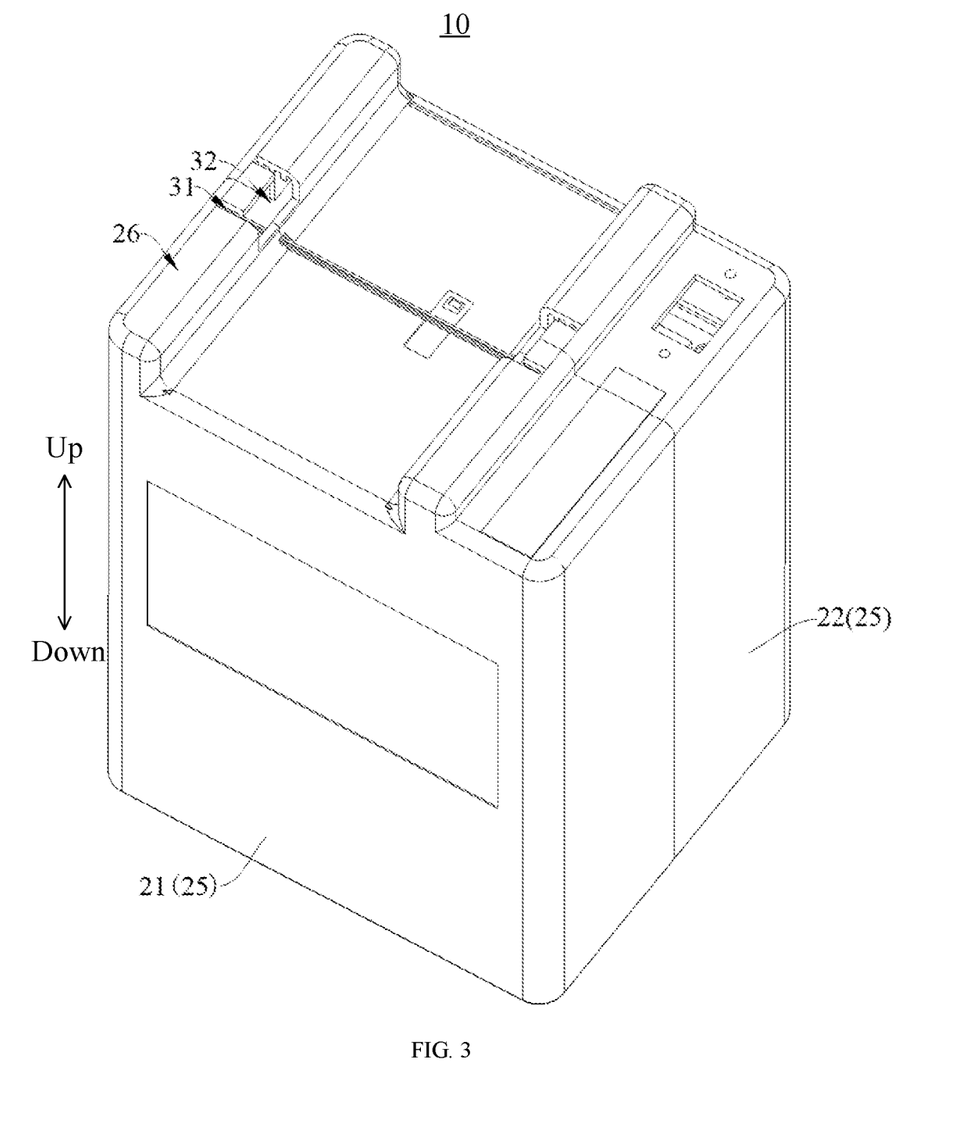
FIG. 3 is a schematic structural diagram of a box according to implementations of the present disclosure.
Figure 5:
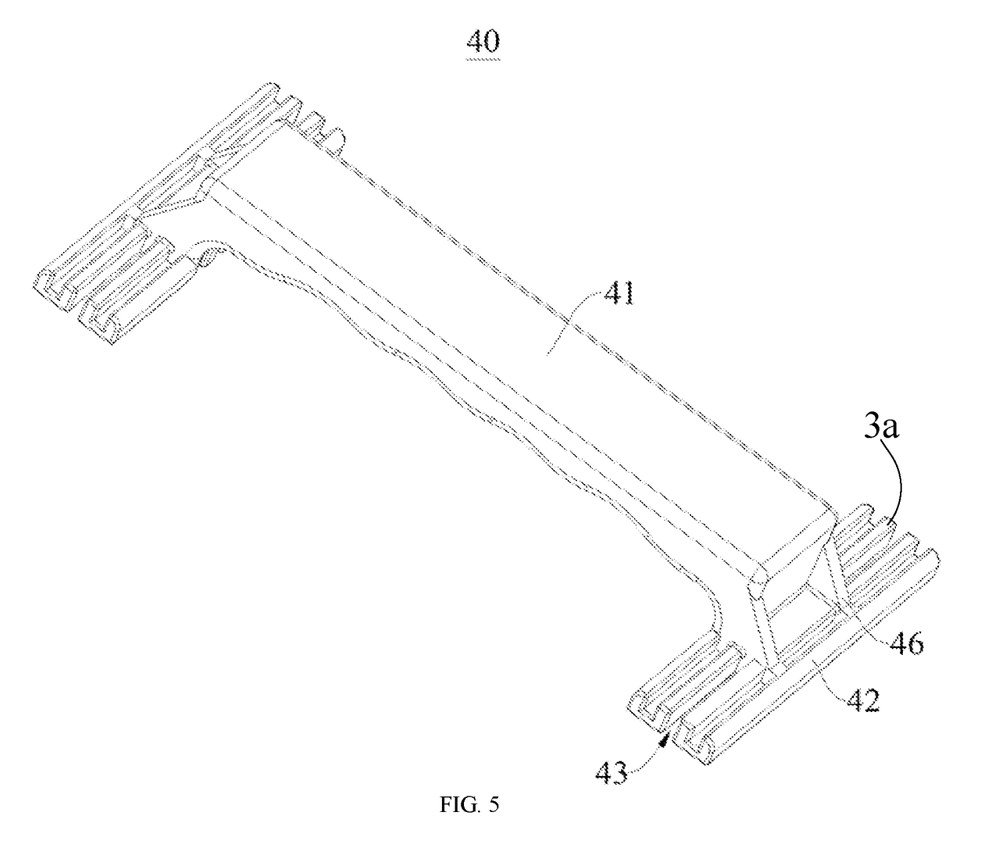
FIG. 5 is a schematic structural diagram of a handle from one angle according to implementations of the present disclosure.

Reference can be made to FIG. 3 and FIG. 5, the first limiting portions may be limiting grooves 31, the second limiting portions may be limiting plates 46, the limiting plates 46 are connected to the handle body 41 and the at least one connecting portion 42, and the limiting plates 46 are spaced apart. In other words, the limiting grooves 31 are defined at the first housing 21 and the second housing 22, and the limiting plates 46 are disposed at the handle 40, which can facilitate arrangement of the first limiting portions at the box 20 and facilitate arrangement of the second limiting portions at the handle 40. In addition, the limiting plates 46 are connected to the handle body 41 and the at least one connecting portion 42, which can not only facilitate disposing of the limiting plates 46, but also improve strength of a connection between the handle body 41 and the at least one connecting portion 42. Moreover, the limiting plate 46 is implemented as two limiting plates 46, and the two limiting plates 46 are spaced apart at the connection. With this disposing, one of the two limiting plates 46 can be in limiting fitment with the limiting groove 31 of the first housing 21, another one of the two limiting plates 46 can be in fitment with the limiting groove 31 of the second housing 22. In other words, the handle 40 can be connected with the first housing 21 and the second housing 22 individually, such that the first housing 21 and the second housing 22 can be provided with extrusion pressures towards each other.

Reference can be made to FIG. 3, the first housing 21 and the second housing 22 further define avoiding notches 32 for avoiding end portions of the handle body 41, and the avoiding notches 32 communicate with the limiting grooves 31. In other words, when the handle 40 is connected with the first housing 21 and the second housing 22, part of the handle body 41 can be in fitment with the avoiding notches of the first housing 21 and the second housing 22. With this disposing, areas of connections between the limiting plates 46 and the at least one connecting portion 42 can be increased, such that strength of the connections between the at least one connecting portion 42 and the limiting plates 46 can be improved. In addition, the avoiding notches 32 are defined to improve an integrity of the connection between the handle 40 and the box 20, which facilitates accommodation of the handle 40.

Reference can be made to FIG. 5, and each limiting plate 46 is in a shape of a right triangle. The limiting plates are connected with the handle body 41 and the at least one connecting portion 42 at two catheti of a right triangle of the limiting plates 46 respectively. With this disposing, a triangular structure is relatively stable, such that when the limiting plates 46 are connected with the handle body 41 and the at least one connecting portion 42 at two catheti of the right triangle of the limiting plates 46 respectively, the strength of the connection between the at least one connecting portion 42 and the handle body 41 is improved.

Figure 1:
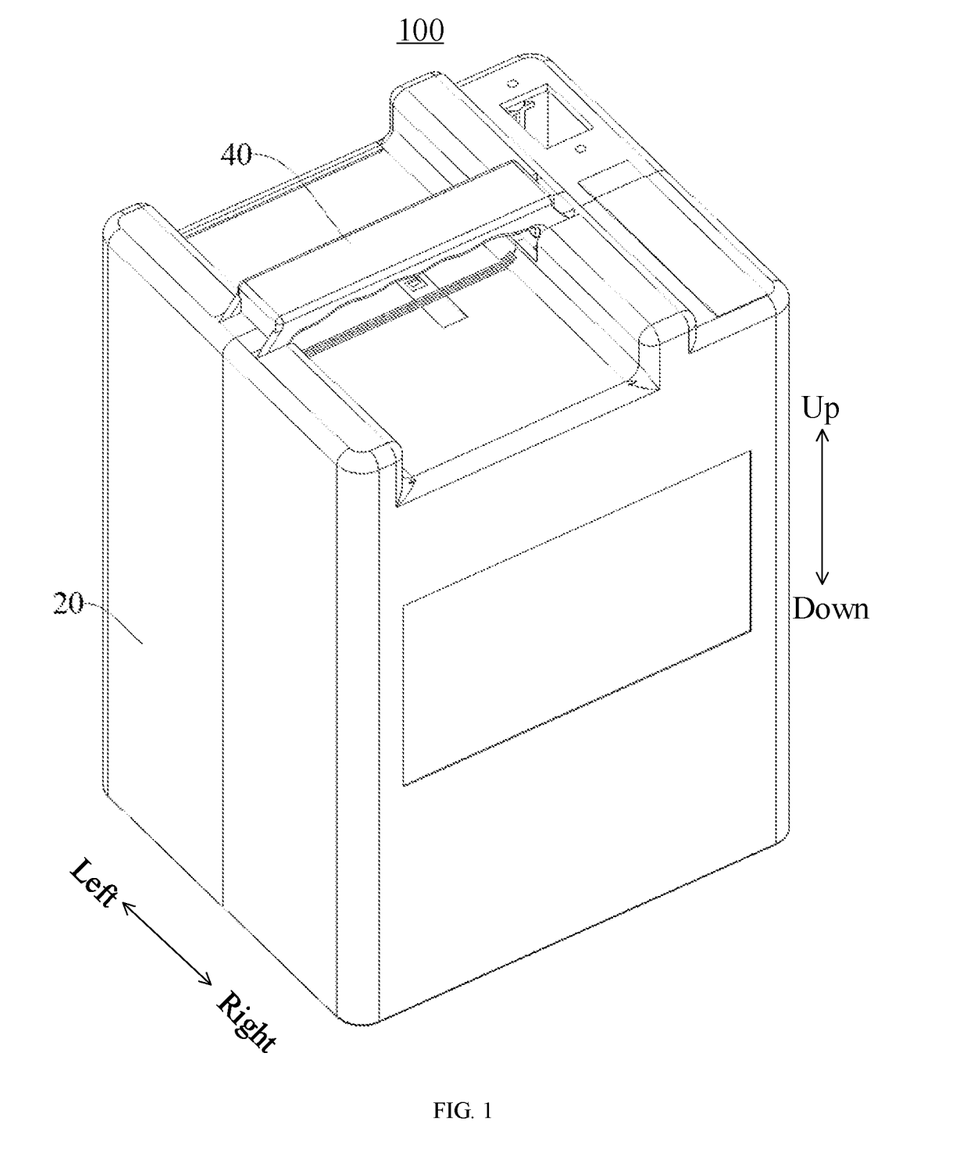
FIG. 1 is a schematic structural diagram of a battery pack according to implementations of the present disclosure.
Figure 2:
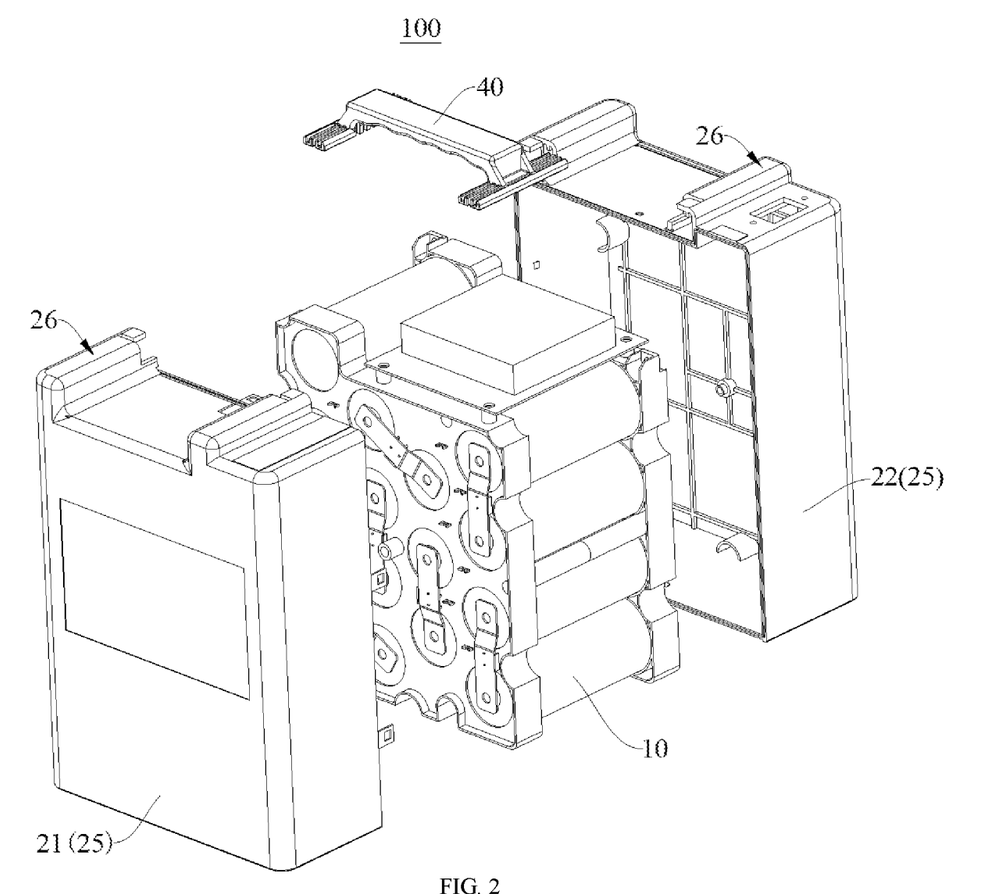
FIG. 2 is an exploded structural diagram of a battery pack according to implementations of the present disclosure.
Figure 4:
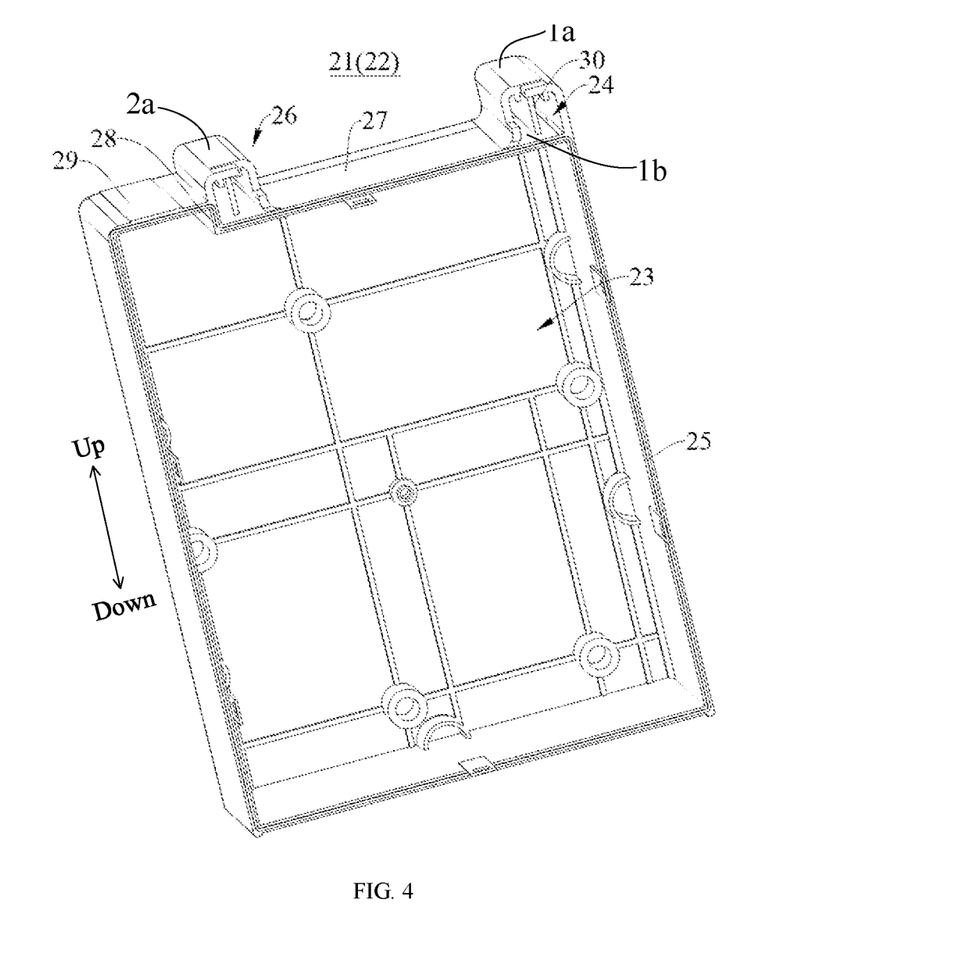
FIG. 4 is a schematic structural diagram of a housing body according to implementations of the present disclosure.

Reference can be made to FIG. 2 to FIG. 4, each of the first housing 21 and the second housing 22 includes a housing body 25 and at least one protrusion 26, and the at least one protrusion 26 is disposed at a side of the housing body 25. In other words, the first housing 21 can include the housing body 25 and the at least one protrusion 26, and the at least one protrusion 26 is disposed at the side of the housing body 25. Similarly, the second housing 22 can also include the housing body 25 and the at least one protrusion 26.

In addition, the housing body 25 of the first housing 21 and the housing body 25 of the second housing 22 are disposed opposite to each other and together define the first accommodation cavity 23. In other words, in this way, the housing body 25 of the first housing 21 can be well snapped into the housing body 25 of the second housing 22 correspondingly, such that the multiple battery cells 10 are well accommodated in the first accommodation cavity 23. Moreover, the at least one protrusion 26 of the first housing 21 and the at least one protrusion 26 of the second housing 22 are disposed opposite to each other respectively and together define the at least one second accommodation cavity 24. Thus, when the handle 40 is connected with the first housing 21 and the second housing 22, the handle 40 can be correspondingly mounted on the at least one protrusion 26 of the first housing 21 and the at least one protrusion 26 of the second housing 22, such that connections of the handle 40 with the first housing 21 and the second housing 22 can be realized, and up-and-down movement of the handle 40 relative to the first housing 21 and the second housing 22 can be realized.

In addition, reference can be made to FIG. 4, and the housing body 25 has a side wall including a first plate portion 27, a second plate portion 28, and a third plate portion 29. The second plate portion 28 is connected between the first plate portion 27 and the third plate portion 29, the second plate portion 28 is connected with the first plate portion 27 and the third plate portion 29 in a bent manner, the third plate portion 29 is higher than the first plate portion 27, and the at least one protrusion 26 is disposed at the first plate portion 27. In other words, the third plate portion 29 is closer to a plane where the top 1a of each of the at least one second accommodation cavity 24 is located than the first plate portion 27. The side wall of the housing body 25 has a multi-flat-surface structure, and the second plate portion 28 is connected between the first plate portion 27 and the third plate portion 29. The first plate portion 27 and the third plate portion 29 are horizontal, and the second plate portion 28 is vertically connected with the first plate portion 27 and the third plate portion 29 in a bent manner. With this disposing, the side wall of the housing body 25 is in a step shape. On one hand, a bearing strength of the side wall of the housing body 25 can be improved. If the side wall of the housing body 25 is disposed as a single flat surface, the side wall of the housing body 25 is easy to be deformed under an action of an external force. Therefore, the side wall of the housing body 25 is disposed as the step shape, such that the side wall of the housing body 25 is not easy to be deformed, durability of the housing body 25 is improved. On the other hand, the housing body 25 can also have a better utilization rate in an upper space of the housing body 25. When the handle 40 is movably connected with the first housing 21 and the second housing 22, the handle 40 corresponds to first plate portions 27, that is, the handle 40 is close to or away from the first plate portions 27.

In addition, reference can be made to FIG. 4, and the at least one protrusion 26 is disposed at the first plate portion 27. In other words, compared with the second plate portion 28 and the third plate portion 29, the first plate portion 27 has an external surface with a relatively large area, so the at least one protrusion 26 is reasonably disposed at the first plate portion 27 to greatly improve strength and stiffness of the at least one protrusion 26. If the at least one protrusion 26 is disposed at the second plate portion 28 or the third plate portion 29, a problem of a poor structural strength of the at least one protrusion 26 is easy to occur, such that when the battery pack 100 is lifted with the handle 40, the at least one protrusion 26 may appear cracks. After long-term use, the handle 40 is likely to fall off the box 20, which leads to local damage to the box 20, and then leads to a problem of replacing an overall box 20. Therefore, the at least one protrusion 26 is disposed at the first plate portion 27, which can greatly prolong service life of the box 20.

In addition, the handle 40 may include two connecting portions 42, and the two connecting portions 42 are connected with two ends of the handle body 41 respectively. In other words, there are two connecting portions 42 axisymmetrically distributed at a left end and a right end of the handle body 41, such that the handle 40 has an axisymmetric structure. In this way, gravity can be uniformly distributed, and a person can lift and carry the battery pack 100 more conveniently.

Moreover, each of the first housing 21 and the second housing 22 may include two protrusions 26, the two protrusions 26 are disposed at two ends of the first plate portion 27 respectively, and the two protrusions 26 of the first housing 21 and the two protrusions 26 of the second housing 22 are disposed opposite to each other respectively and together define two second accommodation cavities 24. With this disposing, a certain space is defined between the two protrusions 26 located at the first plate portion 27, and the handle 40 can be well placed in the space. Furthermore, the two protrusions 26 at the first plate portion 27 correspond to the two connecting portions 42 of the handle 40, and protrusions 26 of the first housing 21 also correspond to protrusions 26 of the second housing 22, such that the connection between the box and the handle 40 is more stable, and the handle 40 is not easy to fall off.

In addition, reference can be made to FIG. 2 to FIG. 4, and a top 2a of each of the at least one protrusion 26 is higher than the third plate portion 29. In other words, the top 2a of the protrusion 29 is farther from a plane where the bottom 1b of the accommodation cavity is located than the third plate portion 32. In this way, especially for the third plate portion 29, a side wall of the box 20 is better protected from being damaged by an external force. When the top 2a of each of the at least one protrusion 26 is lower than the third plate portion 29, no enough space can be provided for the handle 40 to be placed, which make it inconvenient for a person to lift the handle 40. Moreover, when the handle 40 is accommodated, a top surface of the handle 40 can correspond to a top surface of the protrusion 26, such that an integrity of the battery pack 100 can be improved.

Reference can be made to FIG. 4 and FIG. 5, each guiding rib 30 is disposed in each second accommodation cavity 24, each connecting portion 42 defines each guiding groove 43, and the each guiding rib 30 is in fitment with the each guiding groove 43. In other words, the each guiding groove 43 of the each connecting portion 42 is in fitment with the each guiding rib of the each second accommodation cavity 24. With this disposing, the each guiding rib 30 plays a great role in guiding and facilitates fitting between the each connecting portion 42 and the each second accommodation cavity 24, and when the each connecting portion 42 moves up and down relative to the first plate portion 27, the guiding rib 30 can facilitate up-and-down movement of the each connecting portion 42. In addition, fitting between the each guiding rib 30 and the each guiding groove 43 can improve stability of mounting between the each connecting portion 42 and the each second accommodation cavity 24. Moreover, the each guiding rib 30 is disposed in the each second accommodation cavity 24, such that strength of the each second accommodation cavity 24 can be strengthened, and the each second accommodation cavity 24 is not easy to be deformed by an external force.

In addition, the handle body 41 is connected with the each connecting portion 42 at a middle of the each connecting portion 42, and a distance between one end of the each connecting portion 42 and the handle body 41 is identical to a distance between another end of the each connecting portion 42 and the handle body 41. With this disposing, the two connecting portions 42 at two ends of the handle 40 are uniformly stressed, and a user uses less force when lifting and carrying the battery pack 100. Moreover, the two connecting portions 42 at the two ends of the handle 40 are uniformly stressed, which can prevent the first housing 21 and the second housing 22 from being damaged due to uniform stress, reduce a frequency of replacing the handle 40, and improve a use value of the overall battery pack 100 while reducing costs.

Figure 6:
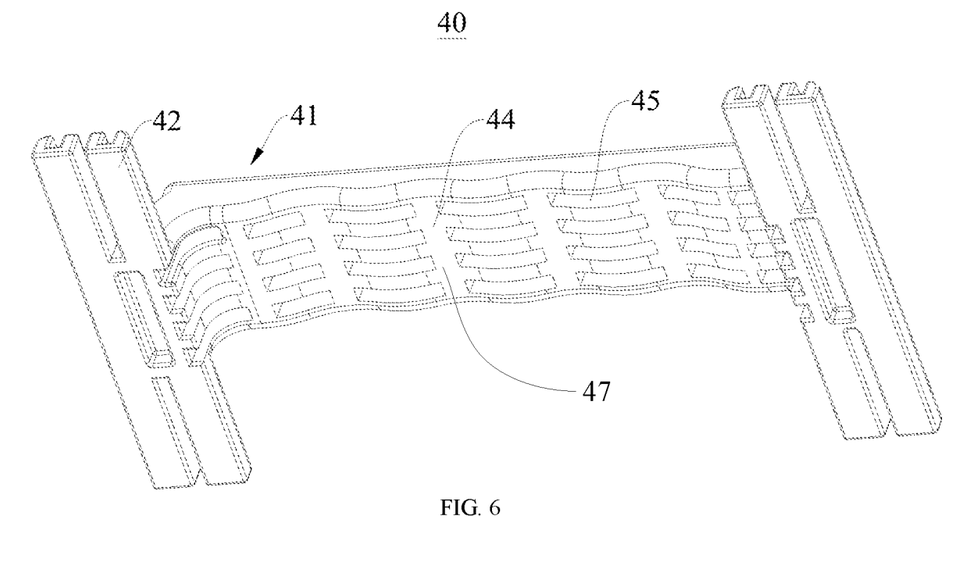
FIG. 6 is a schematic structural diagram of a handle from another angle according to implementations of the present disclosure.

Reference can be made to FIG. 6, and the handle body 41 is provided with multiple stiffeners 44 on a surface thereof facing the box 20. With this disposing, on one hand, the structural strength of the handle 40 can be improved by stiffeners 44, such that the handle body 41 is not easy to be broken, so as to avoid affecting normal use of the handle 40. On the other hand, the stiffeners 44 are disposed on an internal surface 47 of the handle 40, such that dust is difficult to fall on the internal surface 47 and the internal surface 47 is easy to be cleaned, and an integrity of an external surface of the handle 40 can be improved. In other words, the surface of the handle body 41 facing the box 20 is the internal surface 47. Each stiffener 44 may extend in a length direction of the handle 40 or extend in a width direction of the handle 40. With this disposing, the structural strength of the handle 40 can be improved. Furthermore, the multiple stiffeners 44 are not only disposed in the length direction of the handle 40, but also disposed in the width direction of the handle 40, such that the structural strength of the handle 40 can be further improved.

In addition, reference can be made to FIG. 6, weight reducing grooves 45 are defined among the multiple stiffeners 44. In this way, the weigh reducing grooves 45 can reduce a weight of the handle 40, such that the battery pack 100 has a relatively light overall weight and is portable according to a weight of the overall battery pack 100, which is conducive to having a competitive advantage in the same type of products in the market.

According to implementations of a second aspect of the present disclosure, an electrical consumer includes the battery pack 100 in the above implementations. A housing structure of the box 20 of the battery pack 100 is changed, gravity of the battery cells 10 is well distributed at the box 20, such that a problem of the multiple battery cells 10 falling off the bottom of the box 20 due to insufficient bearing force at the bottom of the box 20 can be avoided. In the meanwhile, the battery pack 100 is provided with a movable handle 40, which not only reduces an external occupied space of the handle 40, but also greatly facilitates a person to lift and carry the battery pack 100.

It should be understood that directional relationship or positional relationship indicated by terms such as "center", "longitudinal", "lateral", "length", "width", "thickness", "on", "under", "front", "back", "left", "right", "vertical", "horizontal", "top", "bottom", "in", "out", "clockwise", "anticlockwise", "axial", "radial", "circumferential", and the like is directional relationship or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure.

In the description of the present disclosure, "first feature", "second feature" may include one or more of the features. In the description of the present disclosure, "multiple"means two or more. In the description of the present disclosure, the first feature being "above" or "below" the second feature may include the first and second features in direct contact, or it may include the first and second features not in direct contact but contact through another feature between them. In the description of the present disclosure, the first feature being "on", "above"and "on top of" the second feature include the first feature directly above and obliquely above the second feature, or it simply indicates that the first feature has a higher level than the second feature.

In the description of the present specification, the description with reference to the terms "one implementation", "some implementations", "exemplary implementations", "examples", "specific examples", "some examples", etc., means that the specific feature, structure, material or feature described in combination with the implementation or example is included in at least one implementation or example of the present disclosure. In this specification, the schematic representations of the above terms do not necessarily refer to the same implementation or example.

Although the implementations of the present disclosure have been shown and described, those of ordinary skill in the art may understand that various changes, modifications, substitutions, and variants may be made to these implementations without departing from the principle and purpose of the present disclosure. The scope of the present disclosure is defined by the claims and their equivalents.

What is claimed is:

1. A battery pack, comprising:
   a plurality of battery cells;
   a box comprising a first housing and a second housing, wherein the first housing and the second housing are disposed opposite to each other, the first housing and the second housing together define a first accommodation cavity and a second accommodation cavity, the second accommodation cavity is defined at a side of the first accommodation cavity, the plurality of battery cells are accommodated in the first accommodation cavity, and each of the first housing and the second housing is provided with a first limiting portion at a top of the second accommodation cavity; and
   a handle comprising a handle body, a connecting portion, and second limiting portions, wherein the connecting portion is connected with the handle body, the second limiting portions are connected with the handle body and/or the connecting portion, the connecting portion is accommodated in the second accommodation cavity and is configured to move between the top of the second accommodation cavity and a bottom of the second accommodation cavity, the second limiting portions are in limiting fit with first limiting portions of the first housing and the second housing respectively to provide the first housing and the second housing with extrusion pressures towards each other, and the box and the handle are arranged in a split manner.

2. The battery pack of claim 1, wherein one of the first limiting portion and a second limiting portion is a limiting groove, another is a limiting plate, and the limiting plate is in fit with the limiting groove.

3. The battery pack of claim 2, wherein the first limiting portions are limiting grooves and the second limiting portions are limiting plates, the limiting plates are connected to the handle body and the connecting portion, and the limiting plates are spaced apart.

4. The battery pack of claim 3, wherein the first housing and the second housing further define an avoiding notch for avoiding end portions of the handle body, and the avoiding notch communicates with the limiting grooves.

5. The battery pack of claim 3, wherein the limiting plate is connected with the handle body and the connecting portion at two catheti of a right triangle of the limiting plate respectively.

6. The battery pack of claim 1, wherein each of the first housing and the second housing comprises a housing body and a protrusion, the protrusion is disposed at a side of the housing body, the housing body of the first housing and the housing body of the second housing are disposed opposite to each other and together define the first accommodation cavity, and the protrusion of the first housing and the protrusion of the second housing are disposed opposite to each other and together define the second accommodation cavity.

7. The battery pack of claim 6, wherein the housing body has a side wall comprising a first plate portion, a second plate portion, and a third plate portion, the second plate portion is connected between the first plate portion and the third plate portion, the second plate portion is connected with the first plate portion and the third plate portion in a bent manner, the third plate portion is higher than the first plate portion, and the protrusion is disposed at the first plate portion.

8. The battery pack of claim 7, wherein the connecting portion is implemented as two connecting portions connected with two ends of the handle body respectively, the protrusion of each of the first housing and the second housing is implemented as two protrusions, the two protrusions are disposed at two ends of the first plate portion respectively.

9. The battery pack of claim 1, wherein the handle body is provided with a plurality of stiffeners, and weight reducing grooves are defined among the plurality of stiffeners.

10. An electrical consumer, comprising:
    a battery pack comprising:
    a plurality of battery cells;
    a box comprising a first housing and a second housing, wherein the first housing and the second housing are disposed opposite to each other, the first housing and the second housing together define a first accommodation cavity and a second accommodation cavity, the second accommodation cavity is defined at a side of the first accommodation cavity, the plurality of battery cells are accommodated in the first accommodation cavity, and each of the first housing and the second housing is provided with a first limiting portion at a top of the second accommodation cavity; and
    a handle comprising a handle body, a connecting portion, and second limiting portions, wherein the connecting portion is connected with the handle body, the second limiting portions are connected with the handle body and/or the connecting portion, the connecting portion is accommodated in the second accommodation cavity and is configured to move between the top of the second accommodation cavity and a bottom of the second accommodation cavity, the second limiting portions are in limiting fit with first limiting portions of the first housing and the second housing respectively to provide the first housing and the second housing with extrusion pressures towards each other, and the box and the handle are arranged in a split manner.

11. The electrical consumer of claim 10, wherein one of the first limiting portion and a second limiting portion is a limiting groove, another is a limiting plate, and the limiting plate is in fit with the limiting groove.

12. The electrical consumer of claim 11, wherein the first limiting portions are limiting grooves and the second limiting portions are limiting plates, the limiting plates are connected to the handle body and the connecting portion, and the limiting plates are spaced apart.

13. The electrical consumer of claim 12, wherein the first housing and the second housing further define an avoiding notch for avoiding end portions of the handle body, and the avoiding notch communicates with the limiting grooves.

14. The electrical consumer of claim 12, wherein the limiting plate is connected with the handle body and the connecting portion at two catheti of a right triangle of the limiting plate respectively.

15. The electrical consumer of claim 10, wherein each of the first housing and the second housing comprises a housing body and a protrusion, the protrusion is disposed at a side of the housing body, the housing body of the first housing and the housing body of the second housing are disposed opposite to each other and together define the first accommodation cavity, and the protrusion of the first housing and the protrusion of the second housing are disposed opposite to each other and together define the second accommodation cavity.

16. The electrical consumer of claim 15, wherein the housing body has a side wall comprising a first plate portion, a second plate portion, and a third plate portion, the second plate portion is connected between the first plate portion and the third plate portion, the second plate portion is connected with the first plate portion and the third plate portion in a bent manner, the third plate portion is higher than the first plate portion, and the protrusion is disposed at the first plate portion.

17. The electrical consumer of claim 16, wherein the connecting portion is implemented as two connecting portions connected with two ends of the handle body respectively, the protrusion of each of the first housing and the second housing is implemented as two protrusions, the two protrusions are disposed at two ends of the first plate portion respectively.

18. The electrical consumer of claim 10, wherein the handle body is provided with a plurality of stiffeners, and weight reducing grooves are defined among the plurality of stiffeners.

19. The battery pack of claim 8, wherein each of the two protrusions has a top higher than the third plate portion.

20. The electrical consumer of claim 17, wherein each of the two protrusions has a top higher than the third plate portion.

* * * * *